Sept. 8, 1942.    G. R. MONROE    2,295,414
TRANSFORMER
Filed Aug. 3, 1939    5 Sheets-Sheet 1
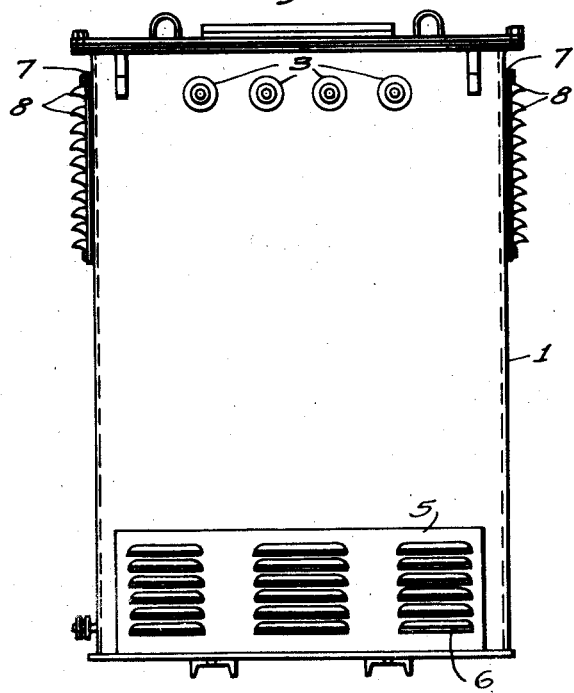
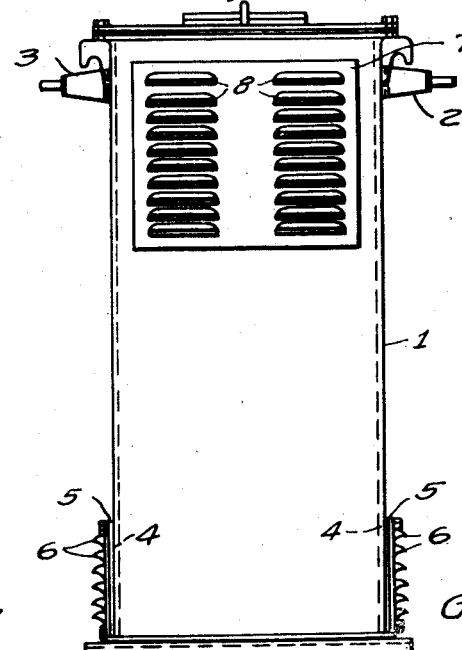
WITNESSES:
INVENTOR
Gordon R. Monroe.
BY
Franklin E. Hardy
ATTORNEY

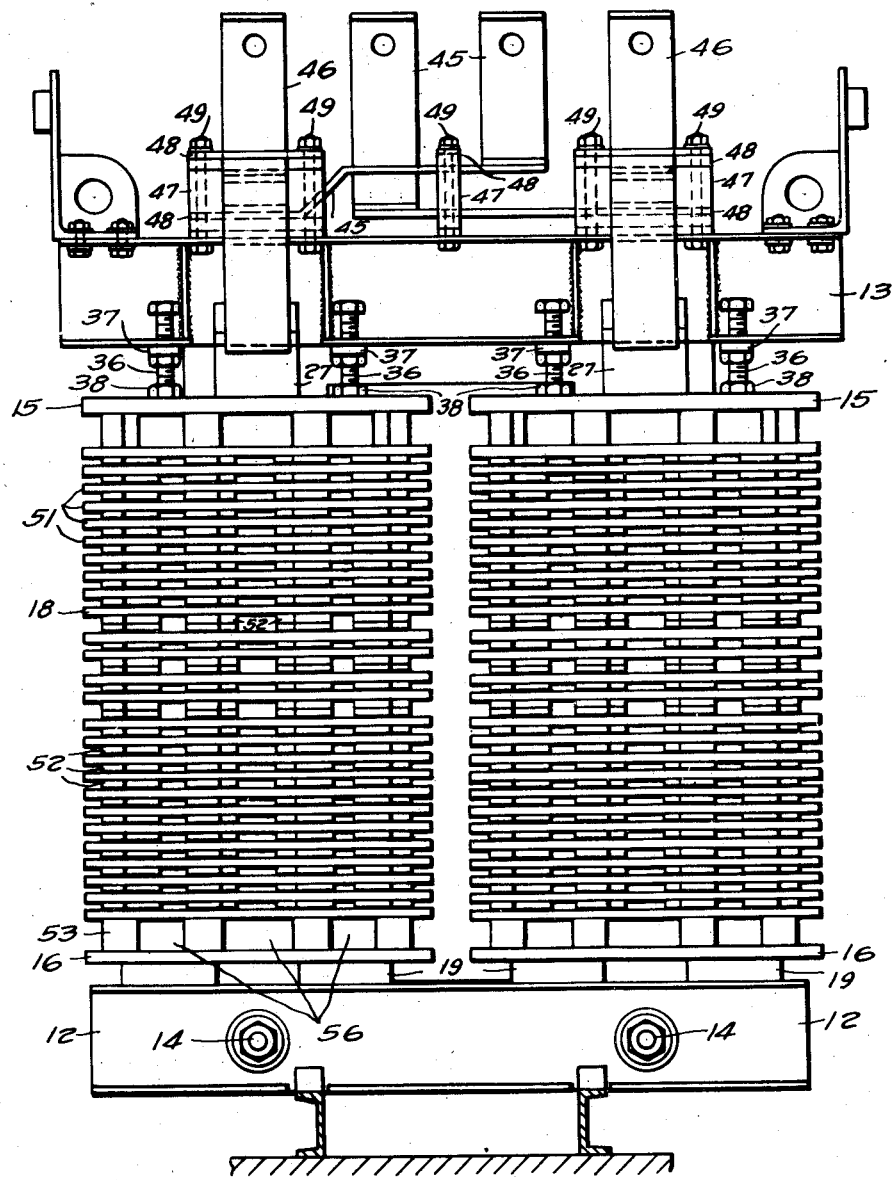

Sept. 8, 1942.  G. R. MONROE  2,295,414
TRANSFORMER
Filed Aug. 3, 1939  5 Sheets-Sheet 3

WITNESSES:

INVENTOR
Gordon R. Monroe.
BY
ATTORNEY

Sept. 8, 1942.   G. R. MONROE   2,295,414
TRANSFORMER
Filed Aug. 3, 1939   5 Sheets-Sheet 4

WITNESSES:
E. A. McCloskey.

INVENTOR
Gordon R. Monroe.
BY
Franklin E. Hardy
ATTORNEY

Sept. 8, 1942.　　　　G. R. MONROE　　　　2,295,414
TRANSFORMER
Filed Aug. 3, 1939　　　　5 Sheets-Sheet 5

WITNESSES:

INVENTOR
Gordon R. Monroe.
BY
Franklin E. Hardy
ATTORNEY

Patented Sept. 8, 1942

2,295,414

UNITED STATES PATENT OFFICE 2,295,414

TRANSFORMER

Gordon R. Monroe, Sharon, Pa., assignor to Westinghouse Electric & Manufacturing Company, East Pittsburgh, Pa., a corporation of Pennsylvania Application August 3, 1939, Serial No. 288,062

3 Claims. (Cl. 175—356)

This invention relates to electrical induction apparatus, such as transformers, employing a core of magnetic material about which primary and secondary windings may be positioned in inductive relation to operate in a well-known manner, and particularly to such apparatus in which the insulating materials are composed entirely of non-inflammable material.

In the construction of apparatus of the character indicated, it is the usual practice to insulate the individual copper coil conductors from adjacent strands with paper or cloth tape impregnated with varnish and to support and space the several coils or parts of the winding by the use of blocks or strips of material, such as Micarta, wood, pressboard, paper or other similar organic material. All of these materials have a low burning point, and may be a source of fire if the temperature is raised to the ignition point.

In many applications of induction apparatus, insulating oil is used which circulates to serve both as an insulating and cooling medium, and this material is also combustible under certain conditions. In accordance with my invention, the use of all organic material for insulating purposes is avoided and the parts are so designed and arranged as to provide air-cooled, air-insulated apparatus. The individual conductors may be insulated from adjacent conductors by asbestos or woven glass tape, and blocks of material, such as porcelain or glass, may be used for centering the low-voltage winding on the core and for centering the low-voltage and high-voltage windings about the core and for transmitting pressure from end frames to the ends of the windings, as well as for spacing the several disc-type coils of the high-voltage winding. The use of such materials assists in providing an air-cooled, air-insulated transformer, all of the materials of which are non-combustible and are capable of withstanding very high temperatures for long periods of time.

It is an object of the invention to provide apparatus of the class described in which the coil spacing and supporting members are made of vitreous inorganic material, such as porcelain, and in which no organic insulating material is employed.

It is a further object of the invention to provide an air-cooled, air-insulated apparatus of the class described in which the coils are supported and spaced by a non-combustible material that will withstand high temperatures for long periods of time.

Other objects and advantages of the invention will be apparent from the following description of a preferred embodiment of the invention, in which:

Figure 1 is a front elevational view of an air-cooled, air-insulated transformer built in accordance with the invention showing the arrangement of the casing structure;

Fig. 2 is an end view of the transformer shown in Fig. 1;

Fig. 3 is a side elevational view taken on the low-voltage side of the core and coil assembly employed in the transformer;

Figure 4:
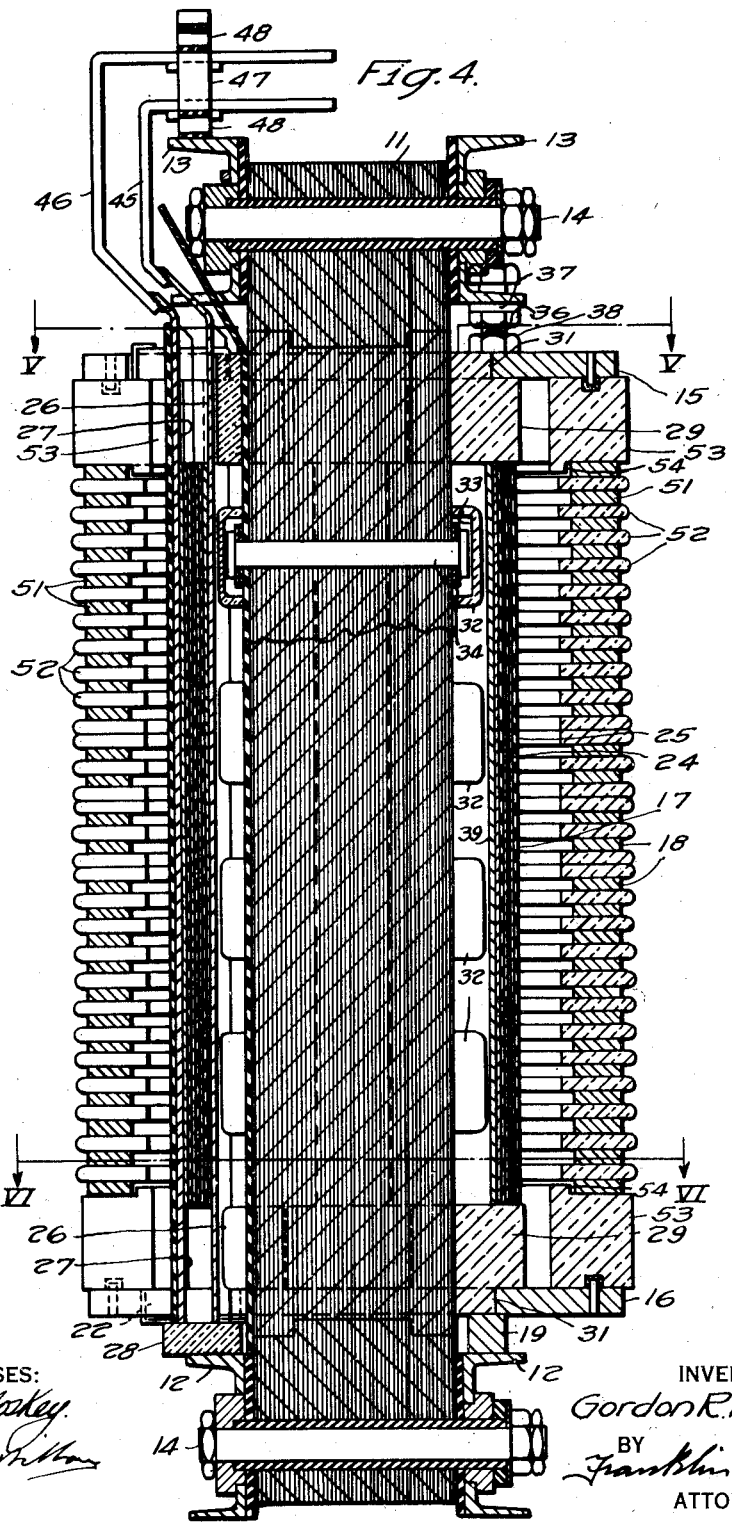
Fig. 4 is a vertical sectional view through one of the core winding legs taken on line IV—IV of Fig. 5.

Referring to Figs. 1 and 2 of the drawings, a casing 1 is illustrated which is shown as being substantially rectangular in shape and having high-voltage bushings 2 extending through the upper portion of one of the two longer side walls, and low-voltage bushings 3 extending through the upper portion of the opposite longer side wall. The lower portion of the longer faces of the side wall are provided with openings 4, over which plates 5 are positioned providing air inlet slots that are shielded from the weather by the overhanging projections 6. Similar openings are provided on the two upper ends of the opposite narrow faces or ends of the casing structure, over which plates 7 are positioned to provide air outlet openings that are similarly shielded from the weather by outwardly extending canopy portions 8. The inlet openings in the lower plates 5 and the outlet openings in the upper plates 7 provide means for permitting air to circulate through the transformer casing by thermal action of the windings on the air within the casing.

Figure 5:
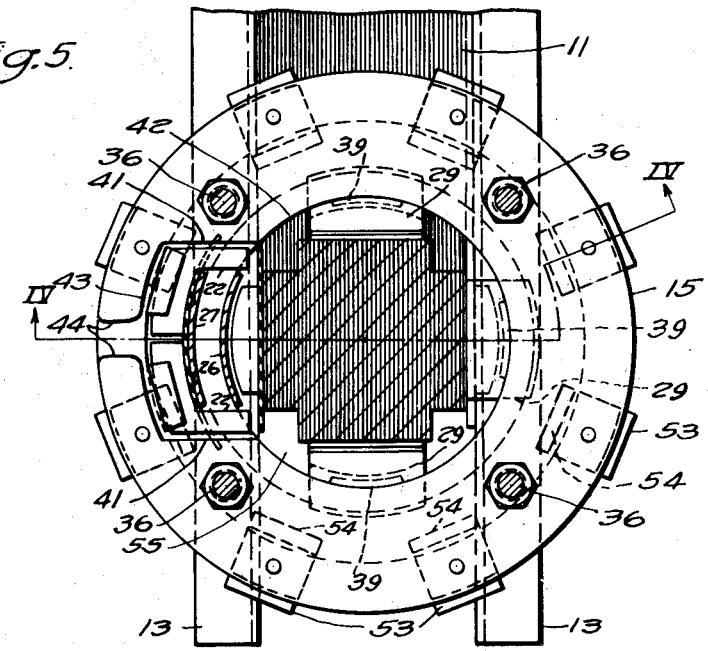
Figs. 5 and 6 are horizontal sectional views taken along the lines V—V and VI—VI, respectively, of Fig. 4.
Figure 6:
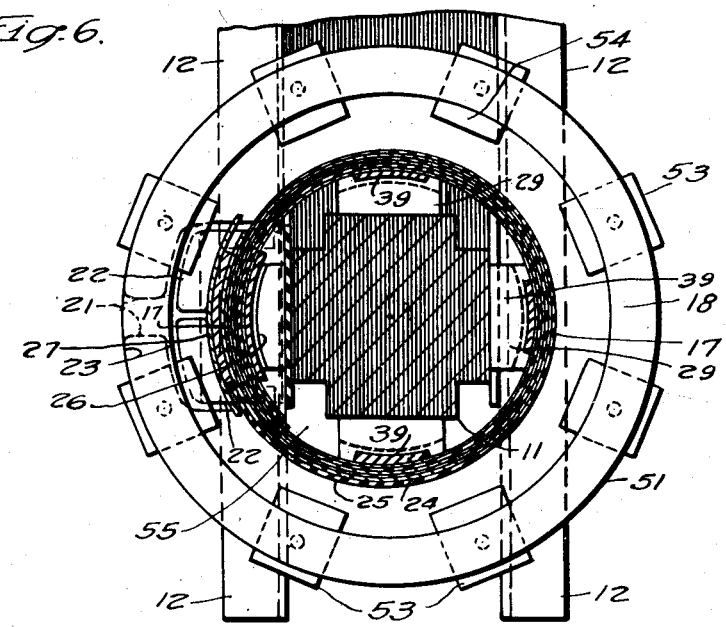

Referring to Figs. 3 to 6 of the drawings, a core-type transformer is illustrated having a core structure 11 provided with two vertically positioned winding legs, as best shown in Fig. 3, connected by two horizontal portions clamped between channels 12 and 13 at the bottom and top, respectively, and held in position by bolts 14. The winding leg portions may be cruciform in cross-section, as best shown in Figs. 5 and 6. Upper and lower steel pressure plates or rings 15 and 16, respectively, are provided for assisting in holding a low-voltage winding 17 and a high-voltage winding 18 in their proper positions about the winding leg of the core 11. The lower pressure plates 16 are supported from the channel irons 12 by block 19, the pressure plate 16 being cut away, to provide a space shown at 21 in Fig. 6, so as not to form a complete winding turn, and also to provide a space for the insulating blocks 22 corresponding in outline to the shape shown in Figs. 7 and 8 for a purpose to be later explained. It will be noted that adjacent the space 21 the pressure ring 16 is cut away on the inner side to accommodate the blocks 22, so that the pressure ring for a slight distance at each end has a radial width corresponding to that shown at 23 in Fig. 6, while for the greater portion of the circumference of the ring a diameter extending substantially from the inner diameter of the coil 17 to the outer diameter of the coil 18 is provided, as best shown in Fig. 4.

Figure 20:
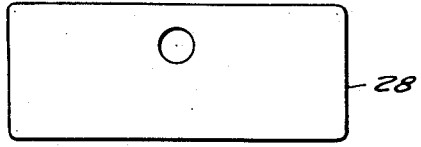
Figure 21:

The low-voltage winding 17 may be formed of a sheet of conducting material 24, such as copper, rolled into a spiral and spaced from adjacent turns by a layer of insulating material 25, the winding conductor of each turn extending substantially from the top to the bottom of the coil. Bus bars 26 and 27 are brazed to the inner and outer ends of the coil and extend both above and below the ends of the coil for the purpose of assisting in supporting the structure. The lower ends of the bars 26 and 27 extend through the space formed by the two L-shaped coil blocks 22 adjacent to a lower insulating block 28 mounted on one of the channel irons 12. The detail shape of block 28 is best shown in Figs. 20 and 21.

Figure 9:
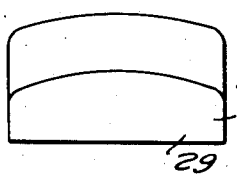
Figure 10:
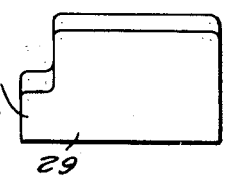
Figure 11:
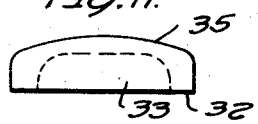
Figure 12:
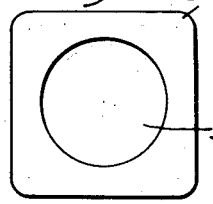
Figure 13:
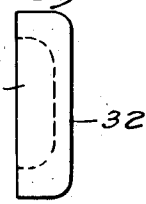
Figure 14:
Figure 15:
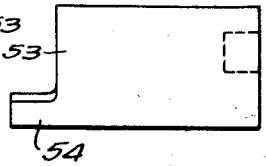

The lower end of the low-voltage winding 17 rests on a plurality of spaced insulating blocks 29, as best shown in Fig. 4, and corresponding in detail construction to the form shown in Figs. 9 and 10. The lower ends of the blocks 29 are provided with arced extending portions 31 that fit within the inner circumference of the pressure ring 16. The winding 17 is spaced from the winding leg of the core 11 by a plurality of coil block centering spacers 32 corresponding in detail form to that shown in Figs. 11, 12 and 13. These blocks are provided with hollow portions 33 for accommodating bolts one of which is shown at 34 and which extends through the laminations of the core structure to apply pressure to the group of laminations. The outer surfaces of the blocks 32 are shown in Figs. 4 and 13 as straight, lengthwise of the winding, and in Fig. 11 as having a curved surface 35 to follow the curvature of the inner surface of the tubular winding 17. A plurality of coil end blocks 29 are positioned above the upper end of the coil 17 between it and the upper end of pressure plate 15. These blocks are of the form of construction shown in Figs. 9 and 10, and are similar to those at the lower end of the winding 17 and are likewise positioned with the inner flat sides against the core winding leg with the arcuate portions 31 extending upwardly between the core and the inner edge of the pressure plate 15.

Figure 7:
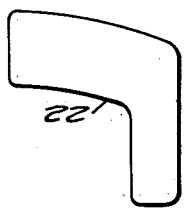
Figs. 7 to 21 are detail views of parts of some of the insulating spacing blocks used in the construction shown.
Figure 8:
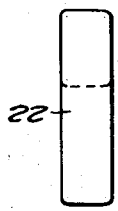
Figure 16:
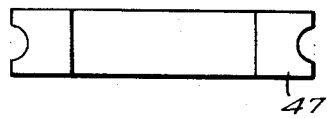
Figure 18:
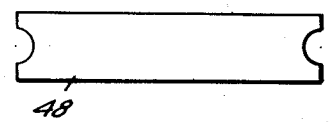
Figure 17:
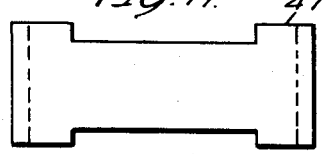
Figure 19:
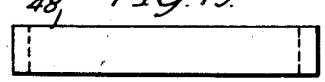

Four pressure bolts 36 are provided extending through the lower flange of the channel iron 13 and screw-threaded in a sleeve 37 attached thereto for the purpose of bringing pressure against pressure nuts 38 carried on the pressure plate 15 for securely positioning the winding assembly between the two pressure plates 15 and 16. For the purpose of stiffening the winding 17, additional strips 39 may be brazed on the inner surface of the first turn of the conductor 24, as best shown in Fig. 6. The upper pressure plate 15 is similar in construction to the lower pressure plate 16 having a width extending from substantially the outer edge of the winding 18 to the inner edge of the winding 17, except at that part of the plate adjacent the winding terminals 26 and 27. As best shown in Fig. 5, this portion of the pressure plate is cut at 41 so that the width of the pressure plate or ring is reduced from that shown at 42 to the value shown at 43, and a space 44 is provided between the ends thereof so that the pressure plate or ring does not form a closed circuit about the winding leg of the core. Between the two cut-away surfaces 41 and the conductor terminals 26 and 27, two coil blocks 22 of substantially L-shaped construction are provided, as shown in Figs. 7 and 8, corresponding to the same number of blocks similarly positioned with respect to the lower ends of the terminals 26 and 27 and the lower pressure plate 16. The upper ends of the bus bars 26 and 27 are connected to low-voltage terminal bars 45 and 46, respectively, which are fastened between lead guide blocks 47 and 48 of porcelain or similar material by bolts 49 shown in Fig. 3. The middle one of the three blocks 47 is shown in detail form in Figs. 16 and 17, and the upper and lower blocks 48 are shown in detail form in Figs. 18 and 19.

The high-voltage winding 18 may consist of a plurality of flat or disc-shaped coils 51 separated by spacers 52. As best shown in Fig. 3, the spacers 52 are arranged in vertical columns between adjacent coils and are spaced about the circumference of the winding in a manner to provide openings radially of the winding between adjacent coils. The winding is positioned between blocks 53 at the upper and lower ends having projections 54 extending within the winding. The upper set of blocks 53 is positioned between the pressure ring 15 and the upper end of the winding 18, and the lower set of blocks 53 is positioned between the pressure ring 16 and the lower end of the winding 18 to assist in clamping the winding 18 firmly in place between the pressure plates 15 and 16.

It will be noted, by reference to Fig. 6, that the blocks 29 supporting the winding 17 are so spaced as to permit the flow of air into the spaces 55 between the winding leg of the core and the coil 17 through the opening within the lower end plate 16, thus permitting air to be conducted upwardly by thermal action within the interior of the coil 17, the air leaving the upper end of the coil between the blocks 19 thereof and within the inner edge of the ring 15. It will also be noted that the blocks 53 are spaced to provide air inlet openings 56 beneath the bottom of the winding 18 permitting the air to rise upwardly between the windings 17 and 18 and pass outwardly beneath the ring 15 between the blocks 53 at the upper end of the winding 18.

There may be some installations in which it is desirable to seal the tank, in which case the plates 5 and 7 shown in Figs. 1 and 2 may be replaced by plates without air passages therein and suitably gasketed to provide a water tight casing. With the tank sealed it will be possible to completely submerge the transformer in water, either by flooding the vault in which the transformer is placed or by placing another tank around the outside of the transformer tank and then filling the outside tank with water. The latent heat of vaporization of the water would be utilized to cool the transformer tank.

It will be apparent from the above description of one preferred embodiment of the invention that I have provided an air-cooled, air-insulated transformer in which the insulating materials are composed entirely of inorganic material that is non-combustible and capable of withstanding high temperatures for long periods of time.

It will be obvious to one skilled in the art that many modifications in the details of construction described may be made within the spirit of my invention, and I do not wish to be limited otherwise than by the scope of the appended claims.

I claim as my invention:

1. An air-cooled, air-insulated transformer comprising a core of magnetic material having a vertically positioned winding leg, a frame structure for the core, a substantially circular upper pressure plate and a substantially circular lower pressure plate extending about the winding leg and operatively associated with the frame structure, tubular low-voltage and high-voltage windings spaced from each other and from the winding leg and positioned between said upper and lower pressure plates by means of insulating blocks of vitreous material to provide a non-inflammable structure, said windings and supporting blocks being spaced radially to provide a space between the core and the inner winding and a space between the two windings for a free circulation of air by thermal conduction, the insulating blocks associated with the inner winding having portions extending within the pressure plates for centering them with respect to the winding leg of the core.

2. An air-cooled, air-insulated transformer comprising a core of magnetic material having a vertically positioned winding leg, a frame structure for the core, a substantially circular upper pressure plate and a substantially circular lower pressure plate extending about the winding leg and operatively associated with the frame structure, tubular low-voltage and high-voltage windings spaced from each other and from the winding leg and positioned between said upper and lower pressure plates by means of insulating blocks of vitreous material to provide a non-inflammable structure, said windings and supporting blocks being spaced to provide a space between the core and inner winding and a space between the two windings for a free circulation of air by thermal conduction, the insulating blocks adjacent the ends of the two windings being staggered circumferentially about the axis of the windings, those associated with the inner winding having portions extending within the pressure plates for centering the pressure plates about the winding leg of the core.

3. An air-cooled, air-insulated transformer comprising a core of magnetic material having a vertically positioned winding leg, a frame structure for the core, a substantially circular upper pressure plate and a substantially circular lower pressure plate extending about the winding leg and operatively associated with the frame structure, tubular low-voltage and high-voltage windings spaced from each other and from the winding leg and positioned between said upper and lower pressure plates by means of insulating blocks of vitreous material to provide a non-inflammable structure, said windings and supporting blocks being spaced radially to provide a space between the core and the inner winding and a space between the two windings for a free circulation of air by thermal conduction, the insulating blocks associated with the inner winding having portions extending within the pressure plates for centering them with respect to the winding leg of the core, and means for adjustably supporting the pressure plates against movement longitudinally of the axis of the windings.

GORDON R. MONROE.